Oct. 27, 1931.                L. L. SHERWOOD                1,829,193
                              CERTIFICATE HOLDER
                              Filed May 5, 1930
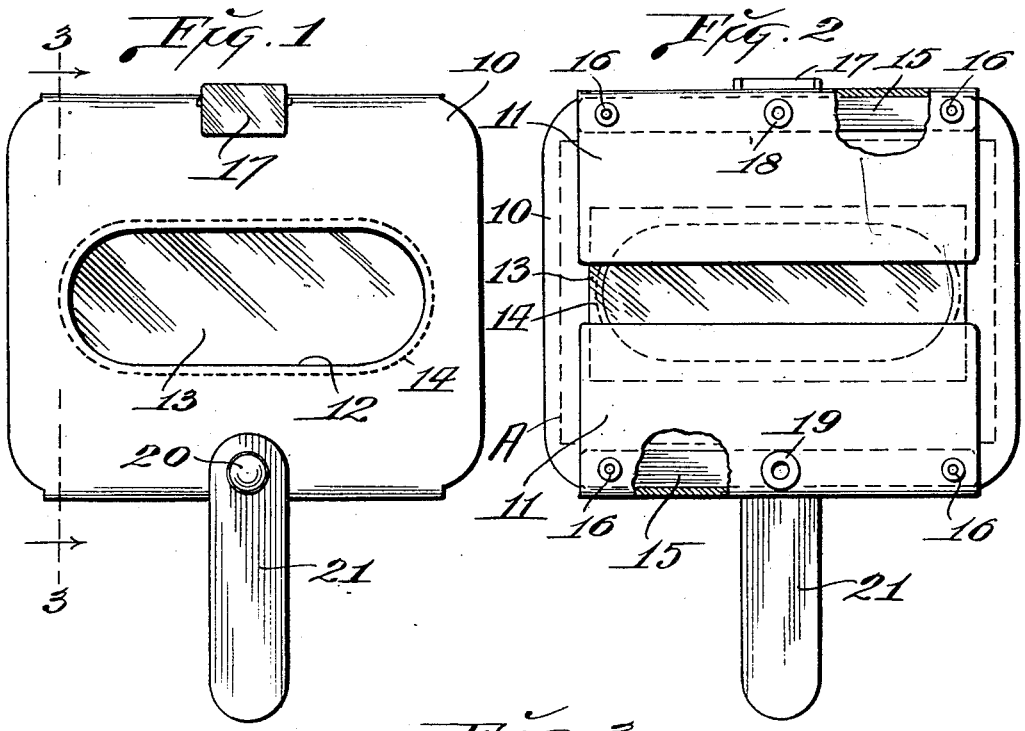
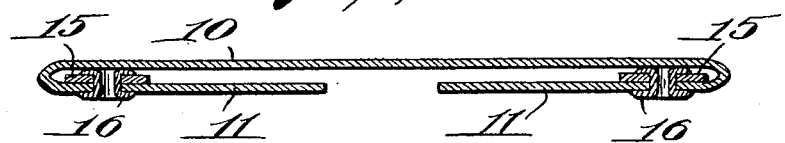
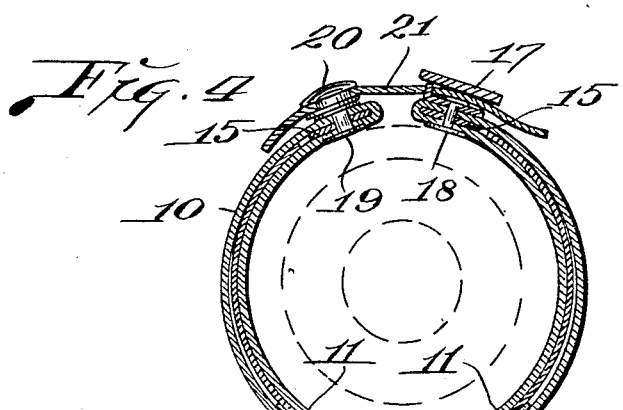
INVENTOR:
Lester L. Sherwood.
By Martin P. Smith ATTY.

Patented Oct. 27, 1931

1,829,193

UNITED STATES PATENT OFFICE

LESTER L. SHERWOOD, OF LOS ANGELES, CALIFORNIA

CERTIFICATE HOLDER

Application filed May 5, 1930. Serial No. 449,793.

My invention relates to a holder for identification certificates and the like that are now generally required by state laws and city ordinances to be carried and displayed upon motor vehicles and the invention herein set forth is an improvement on the certificate holder set forth in U. S. Letters Patent No. 1,671,554, issued to me May 29th, 1928, also U. S. Letters Patent No. 1,771,658, issued July 29, 1930.

The principal objects of my present invention are, to generally improve upon and simplify the construction of the certificate holders disclosed in my aforesaid patents as well as other similar types of certificate holders, to provide a holder of the character referred to that is relatively simple in construction, inexpensive of manufacture, capable of being easily and quickly applied to or removed from a part of a motor vehicle, for instance, the steering column and further, to provide a holder that will receive and display in convenient manner, a certificate that carries data relating to the motor vehicle so that said data may be readily observed by traffic officers or other persons who may have occasion to ascertain the identity and license number of the operator or owner of the vehicle.

Further objects of my invention are, to provide a certificate holder having re-enforced edges so that it will lie snugly against the steering post or column to which it is applied, further, to construct the holder so that the certificate may be easily and quickly positioned therein or removed therefrom, to provide the holder with relatively simple and efficient means for securing the same on the steering column and further, to provide a certificate holder that presents a neat and finished appearance when properly positioned upon the steering column or other part of the vehicle.

With the foregoing and other objects in view, my invention consists in certain novel features of construction and arrangement of parts that will hereinafter be more fully described and claimed and illustrated in the accompanying drawings, in which:

Fig. 1 is a plan view of a certificate holder constructed in accordance with my invention and looking against the outer face thereof.

Fig. 2 is a view looking against the inner face of the holder with parts thereof broken away.

Fig. 3 is an enlarged cross section taken approximately on the line 3—3 of Fig. 1.

Fig. 4 is a cross sectional view of the steering post or column of a motor vehicle and showing my improved certificate holder in position thereupon.

Fig. 5 is a detail view showing a modified construction wherein an elongated eyelet is provided for the reception of the attaching strap.

In the construction of my improved holder the body thereof is formed from a single piece of soft flexible material such as leather, rubberized fabric or the like and the piece of material is cut, preferably by suitable dies so as to form a substantially rectangular intermediate section 10 and a pair of substantially rectangular portions 11 that project from the sides of said intermediate portion 10.

The portion 10 functions as the front wall of the holder and the portions 11 serve as flaps that are folded against the rear face of the front wall. The width of each flap 11 is slightly less than one-half the width of the front wall member 10 so that when the folder is in flat condition with a certificate positioned between front wall member 10 and the flaps 11, the inner edges of said members 11 are spaced apart, as illustrated in Figs. 2 and 3. The length of front wall member is slightly greater than the length of the flaps 11 so that when the holder is positioned on an automobile steering column or the like, the extended ends of said front wall member overlie the ends of the flaps 11 and consequently impart to the ends of the complete structure a neat and finished appearance.

Formed in the center of the member 10 is an opening 12, preferably oval in shape, and applied to the inner face of said member 10, so as to cover said opening, is a sheet 13 of thin flexible transparent material such as celluloid and which is secured to member 10 in any suitable manner, preferably by a row of stitches 14 that parallel the edge of the opening 12.

The construction just described provides a window whereby certain data printed or written upon the face of the certificate may be readily observed when the holder is secured on a part of the vehicle, for instance, the steering post.

To reenforce the sides of the body of the holder so as to cause the same to lie flat upon the post when the holder is positioned for use, narrow strips 15 of thin flexible or resilient metal, for instance, aluminum are positioned between the members 10 and 11 directly adjacent to the lines where the members 11 are folded and these reenforcing strips are secured to the members 11 in any suitable manner, preferably by means of small tubular rivets 16, 16 that pass through the ends of the strips and the adjacent portions of members 11.

These fastening devices 16 do not pass through the member 10 that forms the front wall of the holder and thus the greater portion of the front face of member 10 is left plane and smooth.

A buckle 17 is secured to the central portion of the holder on one side edge thereof by means of a suitable fastening device 18, preferably a rivet which passes through the inner part of the buckle and through the members 10 and 11 and the interposed one of the strips 15.

Secured to the opposite edge of the holder and passing through the members 10 and 11 and the corresponding one of the strips 15 is the stud member 19 of standard form of snap fastener and which stud member is adapted to receive the socket member 20 of the fastener and which latter is seated in one end of a short tongue or strap 21 of leather or other flexible material.

The buckle 17 and strap 21 constitute readily releasable means for securing the holder in position upon a steering column and this strap may be readily disconnected from the buckle or the socket member 20 carried by said strap may be detached from stud member 19.

In some instances it may be found desirable to arrange in one edge of the body of the holder an elongated eyelet 22 for the reception of one end of the strap and which construction is illustrated in Fig. 5.

In the use of my improved certificate holder the certificate of the vehicle driver or owner is inserted between the members 10 and 11 so that it occupies the position illustrated by dotted lines A in Fig. 2 and when so positioned the name, address and registered number of the vehicle and the driver or owner is positioned directly behind the opening 12 where it may be readily observed.

The holder is now applied to the steering column and as said member is curved to correspond with the shape of said steering column the inner edges of the members 11 will move toward each other so as to completely overlie the inner face of the certificate positioned in the holder, thereby serving as a complete protection for the certificate and firmly clamping the same so as to retain it within the holder. After the holder has been thus fitted about the steering column the strap 21 is inserted through buckle and after being drawn taut the buckle is secured and thus the holder with the certificate enclosed is properly positioned upon the steering column.

Inasmuch as the ends of the front wall member 10 project beyond the ends of the flap 11, said projecting ends will overlie and protect the ends of the inserted certificate and thus all portions of said certificate are protected against discoloration as a result of dust, moisture and the like.

Thus it will be seen that I have provided a certificate holder that is relatively simple in construction, inexpensive of manufacture and very effective in performing the functions for which it is intended.

The holder when properly positioned upon a steering column or the like presents a neat and pleasing appearance and the strap which secures the holder in position upon the steering column may be readily disengaged from either side of the holder in the event that it is desired to remove the holder for the purpose of effecting an exchange of certificates.

It will be understood that minor changes in the size, form and construction of the various parts of my improved certificate holder may be made and substituted for those herein shown and described without departing from the spirit of my invention, the scope of which is set forth in the appended claims.

I claim as my invention:

1. In a certificate holder, a body formed from a single piece of flexible material and comprising an intermediate portion in which is formed an opening and a pair of side portions that are folded against the rear face of the intermediate portion, a section of flexible transparent material overlying the opening in the intermediate portion, reenforcing strips of thin flat flexible material having their ends secured to the end portions of the folded side portions and readily releasable means for connecting the sides of the body of the holder and securing the same in position upon a support.

2. In a certificate holder, a body formed from a single piece of flexible material and comprising an intermediate portion in which is formed an opening and a pair of side portions that are folded against the rear face of the intermediate portion, a section of flexible transparent material overlying the opening in the intermediate portion, reenforcing strips of thin flat flexible material having their ends secured to the end portions of the folded side portions and positioned between the sides of the front portion and the sides of said folded side portions, a strap and readily releasable means secured to the intermediate portions of the sides of the body of the holder and to the central portions of said reenforcing strips for connecting said strap to the sides of the body of the holder.

In testimony whereof I affix my signature.

LESTER L. SHERWOOD.